Aug. 14, 1956    P. A. CRANDELL ET AL    2,759,101
HIGH FREQUENCY APPARATUS

Filed March 18, 1953    3 Sheets-Sheet 1

INVENTORS
PAUL A. CRANDELL
RICHARD M. HATCH JR.
BY
Joseph Weingarten
ATTORNEY

INVENTORS
PAUL A. CRANDELL
RICHARD M. HATCH JR.

United States Patent Office

2,759,101
HIGH FREQUENCY APPARATUS

Paul A. Crandell, Roxbury, and Richard M. Hatch, Jr., West Concord, Mass., assignors to Laboratory for Electronics, Inc., Boston, Mass., a corporation of Delaware Application March 18, 1953, Serial No. 343,024

16 Claims. (Cl. 250—36)

The present invention relates in general to high frequency electrical energy transmission systems and more particularly concerns apparatus for cascading and intercoupling a plurality of electron tubes for stable and efficient high frequency operation.

There are available numerous electron tubes for use as oscillators, frequency multipliers and amplifiers in electronic equipment in the frequency range extending to 2500 megacycles per second. Among these, the planar electrode triode, otherwise known as the lighthouse tube, is particularly suitable because it maintains relatively high amplification and transconductance at these frequencies and transit time effects are minimized. Further, because in its design are combined small size and rugged construction, it is ideal for fixed and mobile radar applications. Representative of this tube class is the recently developed and commercially available 2C39A triode which employs electrode terminals in the form of short, coaxial cylinders of increasing diameters for cathode, grid and anode connections, respectively.

In the design of an ultra high frequency amplifier, oscillator, or the like, using a tube having these general characteristics, the considerations involved are numerous and complex. The final choice will be dependent upon such factors as power and space requirements and transmission and coupling circuit elements necessary and available for operation in the specified frequency range. Examination of the literature and patent art reveals that the lighthouse tube, noted above, when chosen for high frequency operation, is almost universally used in coaxial line systems, primarily because its ring-shaped, varying diameter electrode connectors facilitate coupling the tube input and output electrodes to concentric tubular conductors. In the most commonly accepted practice, the tube is positioned within a coaxial cavity resonator terminated at one end by the tube itself and at the other end by an adjustable short-circuiting plunger. Signal energy is extracted from the resonant circuit through a suitable loop or probe and coaxial line and coupled into a second tuned resonator-tube arrangement by a similar loop or probe, for achieving further gain.

In such prior arrangements, each stage required its own resonator structure so that the space requirement was high, but aside from mechanical complexities, tuning became an involved problem by virtue of the many necessary interdependent adjustments. Further complicating such apparatus, the interconnecting coaxial lines were themselves frequency sensitive, and, as a consequence, little flexibility was available.

In attempts to avoid the disadvantages noted, there have been disclosed arrangements for cascading two high frequency triodes in a unitary structure. Although some of these prior attempts have succeeded in thus compacting two tubes, they have done so only at an actual further increase in mechanical complexity and adjustments required for suitable energy transmission and gain.

The present invention contemplates and has as a primary object the provision of a high frequency coaxial structure adapted to support an electrically intercoupled and cascaded arrangement of any desired plurality of high frequency electron tubes for such functions as signal amplification, frequency multiplication or mixing. Reliability and electrical efficiency are maximized substantially through the elimination of interstage coupling cables, loops, or probes, and numerous resonator short-circuit adjustments.

In one specific aspect of the present invention, a plurality of lighthouse electron triodes are axially supported and wholly enclosed within a cylindrical conductor transversely partitioned to define coaxial input and output circuits for the tubes employed. Means are provided for facilitating access to the electron tubes so that tube substitution, when required, is conveniently accomplished. In addition, simple but effective and dependable arrangement is made for forced ventilation of the power dissipating elements of the tubes, when required.

As a further novel aspect of the present invention, means are provided for achieving the tuning essential for operation with maximum energy transfer, and these tuning means function additionally to permit application of heater power, plate potential and grid bias to the tubes. The high frequency system is in this manner substantially isolated from the basic power sources, whereby undesired leakage is held to a minimum.

It is, therefore, another object of the present invention to provide means for axially intercoupling substantially any number of high frequency electron tubes within a unitary conductive housing.

A further object of the present invention is to provide a concentric line structure for axially and internally supporting a plurality of lighthouse type electron tubes without unduly restricting access to the tubes.

Still another object of the present invention is to provide means for applying heater power and static potentials to coaxially supported electron tubes while precluding leakage and undesired coupling between high frequency and low frequency circuits.

A still further object of the present invention is to provide a coaxial coupling arrangement for electron tubes, the principles of which are readily adapted to use with a lighthouse tube as a multi-stage amplifier, frequency converter, oscillator, or mixer.

These and other objects of the present invention will now become apparent from the following detailed specification when taken in connection with the accompanying drawing in which:

Fig. 2A is an enlarged cross-sectional view illustrating certain details of construction shown in Fig. 2;

Figure 1:
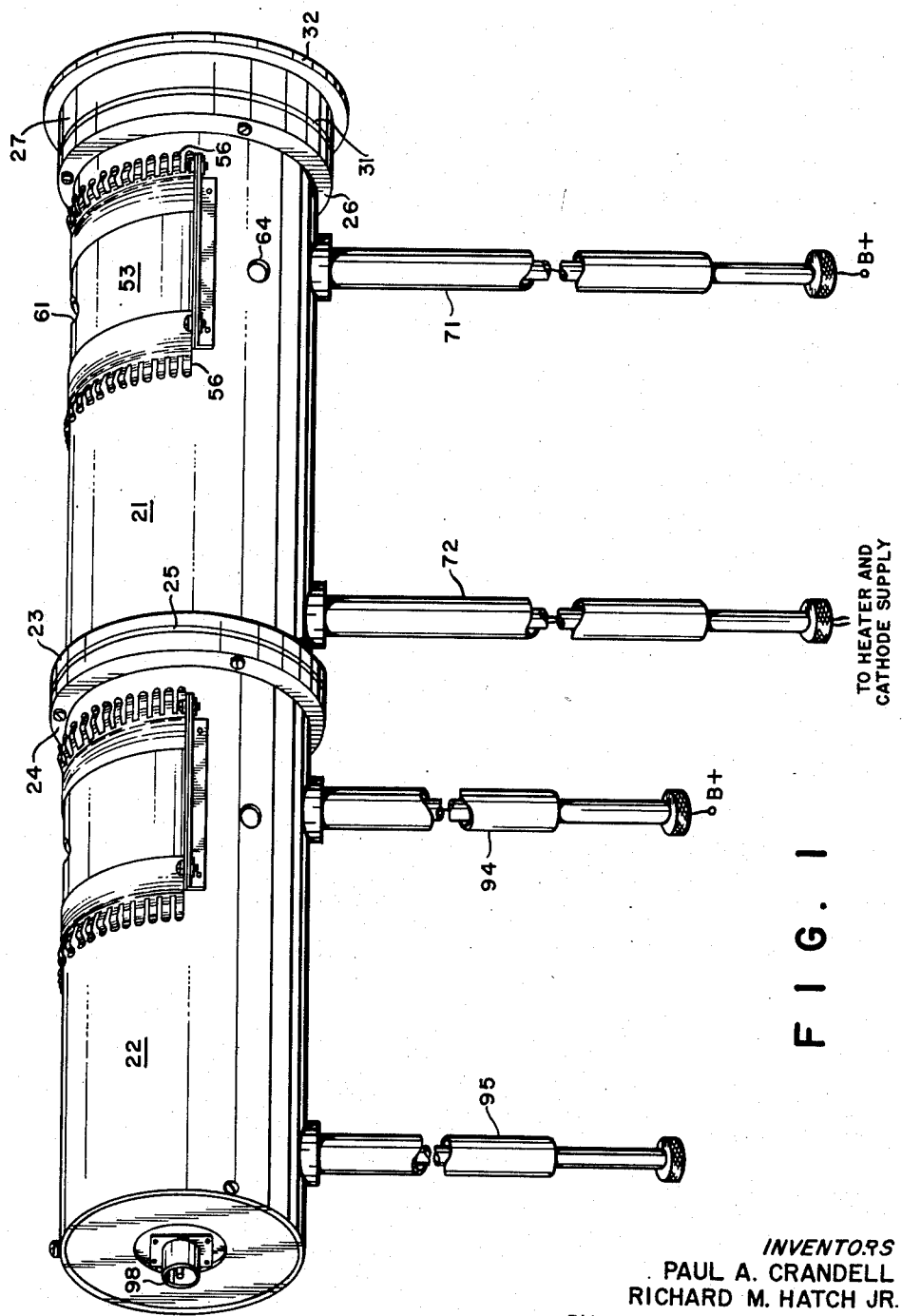
Fig. 1 is a general perspective view illustrating the external appearance of the cascaded coaxial electron tube structure of this invention when in use as a combination of frequency multiplier and amplifier.
Figure 2:
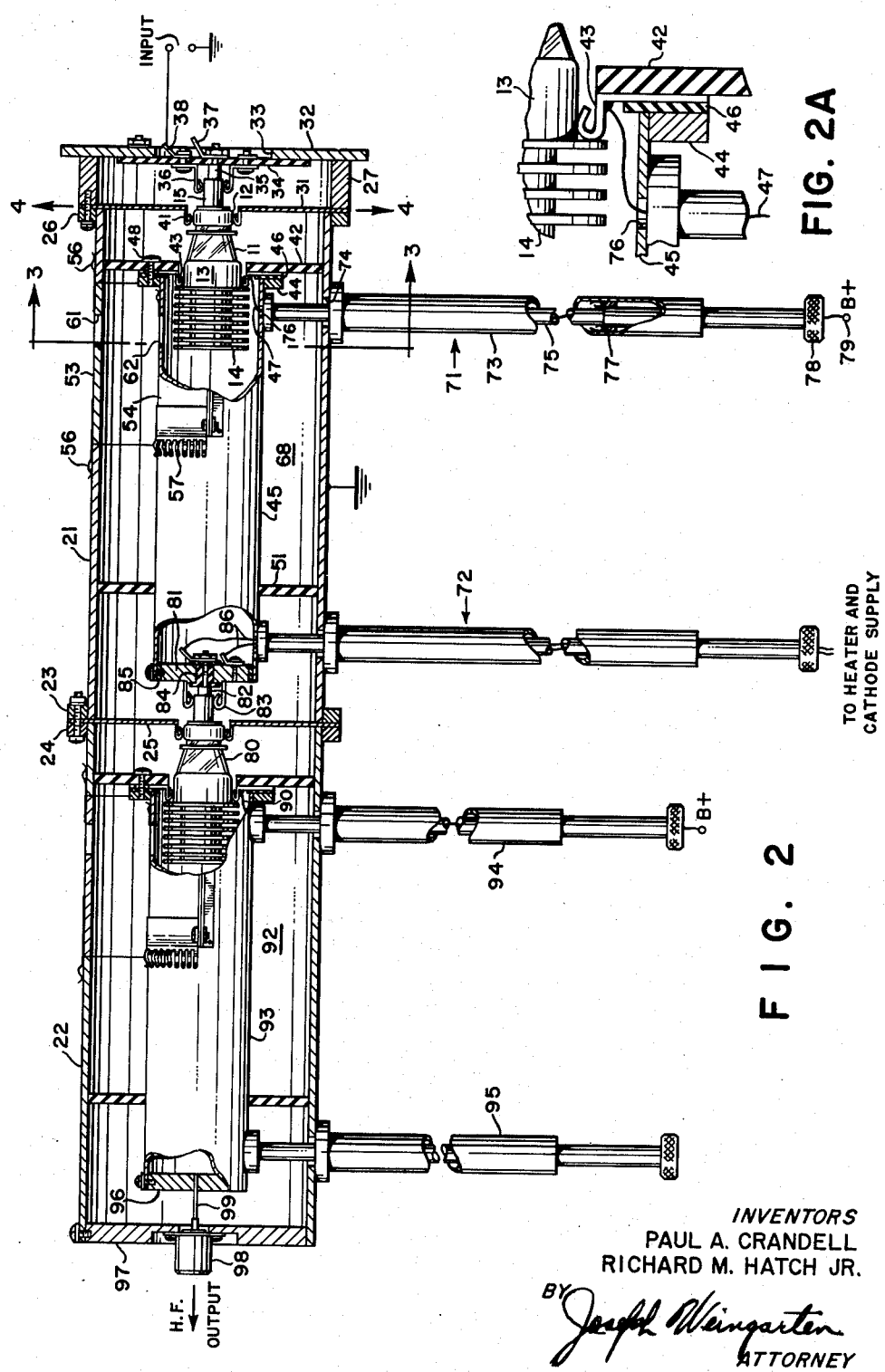
Fig. 2 is a side view, partly in cross section, of the apparatus shown in Fig. 1.

With reference now to the drawings, and more particularly to Figs. 1 and 2 thereof, there is shown the external appearance and internal structural details of a two-stage coaxial frequency multiplier and amplifier utilizing lighthouse tubes such as that identified by reference numeral 11 in Fig. 2. For the precise physical and dynamic characteristics of a tube of this type, reference is made to the technical data furnished with the commercially available 2C39A, which is a high-mu triode designed for radio frequency applications having of the order of 25 watts of usable output in operation up to several thousand megacycles per second. However, for a clear understanding of the application of such tubes to the apparatus shown in the drawing, it is deemed in order to point out briefly that the tube includes an evacuated glass envelope having a conductive cylinder 12, which is the connection to the control grid plane, and a cylindrical conductive anode connection 13 from which there extends a metallic block 14 having a large number of integral circular heat-transfer fins for the effective removal of plate dissipation. At the opposite end of the tube, a cylindrical conductive sleeve 15 furnishes a radio frequency cathode connection and, together with a coaxial sleeve enclosed therein (not shown in the drawing), provides means for introducing the necessary heater power.

The mechanical arrangement illustrated in the drawing comprises essentially a concentric structure having an outer shell preferably formed of a pair of conductive cylinders 21 and 22 joined end to end by flanges 23 and 24 on opposite sides of a transverse conductive circular disk 25.

The system input assembly is bolted to annular flange 26 affixed to the right-hand end of cylinder 21. This assembly includes a conductive ring separator 27, capped at one end by disk 31 and at the other by end plate 32. Plate 32 is formed with an opening 33 covered by an insulating disk 34. Centrally supported upon disk 34 is a conductive post 35 which contacts the inner heater connection of the tube, and a spring finger collet 36 for contacting cathode connector 15. Terminals 37 and 38 are provided to receive the wires necessary to energize the heater and cathode terminals of lighthouse tube 11.

Transverse disk 31 is formed with an axial opening and supports contact collet 41 for resiliently receiving grid connector 12. With outer cylinders 21 and 22 at ground potential, it is clear that tube 11 operates with a grounded grid. Necessary bias potential may be applied to cathode connector 15.

The anode of tube 11 is ordinarily operated at a relatively high D. C. potential, which, for a 2C39A, may be of the order of 1000 volts. With particular reference to Figs. 2 and 2A, it will be noted that disk 42 of suitable insulating material supports the anode spring contact 43, which in turn, is secured between disk 42 and conductive flange 44 on the right-hand end of inner coaxial conductor 45. A thin annulus 46 of an insulating substance, such as Teflon, insulates flange 44 from connector 43 and additionally functions as the dielectric of a capacitor formed by these conductors. The capacitance thus provided is a sufficient high frequency by-pass to ground to preclude undesired high frequency coupling into the anode potential supply lead 47. Clearance holes are provided in contact ring 43 so that bolt 48 does not short-circuit the two metallic members forming the capacitor.

The concentric alignment of cylinder 45 is maintained by intermediate insulating disks 51 and 42, and appropriate means may be provided for precluding axial displacement thereof.

Tube removal and substitution are facilitated by a pair of hinged, semi-cylindrical access plates 53 and 54 in concentric cylinders 21 and 45, respectively. Fig. 1 best illustrates the external appearance of access plate 53, and access plate 54 is similar, though of smaller diameter and lesser axial length. The cross-sectional view Fig. 3 appropriately illustrates the hinge and bolt-down flanges. Phosphor bronze, arcuate spring contactors 56 and 57 are respectively provided at the edges of access plates 53 and 54 for the prevention of energy leakage at these junctions. With both access plates 53 and 54 in their open position, lighthouse tube 11 may be manually slipped from its contactors and withdrawn for test or substitution.

Figure 3:
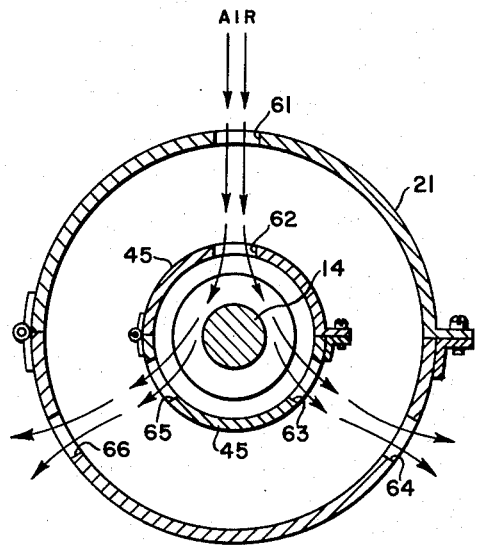
Fig. 3 is a cross-sectional view taken along the lines 3—3 of Fig. 2.

With special reference to Figs. 1, 2 and 3, a plurality of openings are provided in concentric cylinders 21 and 45 permitting the forced circulation of cooling air furnished by a blower (not shown) over the anode fin array. Air is introduced through openings 61 and 62 in the access plates 53 and 54, respectively, and there divided and exhausted through openings 63, 64, 65 and 66 in the cylindrical walls.

Region 68 between concentric cylinders 21 and 45 is electrically tunable by a pair of similar concentric line stubs 71 and 72, of variable length. Stub 71, by way of example, is comprised of an outer metallic cylinder 73 secured to cylinder 21 over opening 74, and an inner conductive cylinder 75 extending through opening 74 and attached to inner line member 45 over opening 76. The space between concentric cylinders 73 and 75 is tuned by means of short-circuiting plunger 77 slidable over cylinder 75 and attached to the knurled knob 78. High voltage lead 47 extends from its junction with anode spring collet 43 through opening 76 and through the inner concentric cylinder 75 to a suitable high-voltage supply schematically designated as B+ at terminal 79. Thus, stub 71 serves in dual capacity enabling critical frequency adjustment of the high frequency transmission path and in enabling introduction of the static high potential without high frequency leakage or other undesirable effects.

In the assemblage disclosed, means are provided for supporting a second lighthouse tube 80. Thus, cylinder 45 is terminated opposite tube 11 by a conductive disk 81 upon which are secured axial heater connecting post 82 and heater-cathode connecting spring retainer 83. An insulating bushing 84 is provided to isolate post 82 from conductive plate 81 and a thin insulating annulus 85 isolates conductive plate 81 from grounded cylinder 45. Wires 86 are employed to furnish lighthouse tube heater power and cathode bias, and are made accessible for external connection to appropriate supplies through the inner tubular conductor of stub 72 in a manner similar to that already noted above for the high voltage lead energizing lighthouse tube 11.

Grid disk 25 effectively grounds the grid plane of tube 80, and a high voltage lead 90 furnishes the necessary anode power. In the anode region of the second tube, access plates are again provided for insertion and withdrawal of tubes as needed. In view of the repetitive pattern of the apparatus supporting the second tube, no further descriptive treatment thereof is required.

Region 92, forming the high frequency transmission path between cylinders 22 and 93, is tuned by a pair of stubs 94 and 95 similar in construction to stubs 71 and 72, described earlier. Stub 94 is used for withdrawal of high voltage lead 90.

The two-stage cascade arrangement is terminated by a pair of conductive disks 96 and 97 sealing cylinders 93 and 92, respectively. A coaxial connector 98 is centrally secured to disk 97, and a wire 99 attached to the center terminal of connector 98 connects to disk 96. Thus, a coaxial cable (not shown) may be attached to connector 98 and used to couple the high frequency signal output of the system to an antenna or other utilization device, as appropriate.

Having set forth the structural features of the apparatus illustrated in Figs. 1 to 3, detailed operation thereof may now be considered. The system illustrated is a two-stage, cascaded high frequency multiplier. The low frequency input signal is applied to the input circuit of lighthouse tube 11 between cathode contactor 36 and ground. Tube 11 operating with grounded grid furnishes an amplified output, which as an electron stream between grid and anode, couples wave energy into the transmission path between cylinders 21 and 45. The oscillating field thereby created between grid plane 25 and cathode contactor 83 drives lighthouse tube 80 which in turn will provide an amplified output between its grid and anode planes. This energy transmitted through the region 92 ultimately is coupled to the output cable. Each tube introduces a power and/or voltage gain as determined by its particular characteristics and the applied potentials, so that the system gain equals the sum of the individually cascaded tubes. When tube 11 is operated as an amplifier, the region between cylinders 21 and 45 is tuned to the input frequency by stubs 71 and 72, if tube 80 is to be operated as a frequency multiplier, region 92 between cylinders 22 and 93 is tuned to the desired harmonic of the input. As a consequence, stubs 94 and 95, and cylinders 93 and 22 are shorter than the respective parts of the previous stage.

The region between the output circuit of tube 11 and the input to the second tube 80 is a length of concentric transmission line. For operation as a power amplifier, the signal drive is from high impedance output to low impedance input. To effect the necessary impedance transformation, this line length is preferably substantially equal to an odd multiple of quarter wavelengths at the frequency of operation. Similar conditions are applicable to the drive from the second lighthouse tube to the output connector 98. The tuning stubs shown permit optimum adjustment of the impedance values.

The utility of apparatus as described hereinabove may best be illustrated with reference to actual tests. Using tube 2C39A lighthouse tubes, an input signal frequency of 140 megacycles was multiplied and the third harmonic derived. With a plate input of 5 watts, an efficiency of 15% was readily obtained. Similar results were obtained with a harmonic generator having an input of 420 megacycles and an output of 1260 megacycles.

Figure 4:
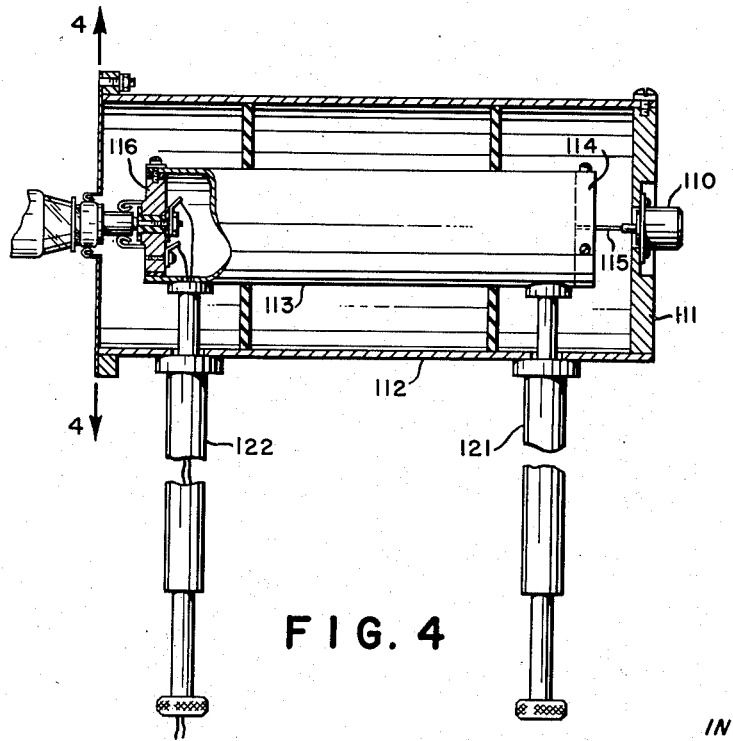
Fig. 4 is a side cross-sectional view of a modification of the input circuit of the apparatus shown in Figs. 1 and 2 for fixed high frequency amplification.

Fig. 4 illustrates an alternate input circuit embodiment for the introduction of higher frequency input signals. Where required, this apparatus may be substituted for the assemblage disposed right of plane 4—4 in Fig. 2. This input is comprised of a coaxial connector 110 affixed upon a conductive disk 111 capping one end of conductive cylinder 112. An inner concentric line member 113 is terminated by a conductive disk 114 to which the center conductor input of terminal 110 is connected by wire 115. The opposite end of inner cylinder 113 is terminated by a disk 116 upon which means for contacting the heater and cathode of a lighthouse tube are assembled essentially in the same manner as that described for disk 81 in Fig. 2. Tuning stubs 121 and 122 permit the necessary impedance adjustments, and with respect to the latter, the introduction of heater and cathode potentials.

In operation, high frequency signal may be applied from an input coaxial cable (not shown) through connector 110 to the region between concentric line members 112 and 113. This input energy drives the first lighthouse tube, and although not shown, successive cascaded stages may be used for amplification at input frequency or for frequency multiplication to meet the demands of a still higher frequency utilization circuit.

The foregoing two paragraphs have described an alternate input arrangement. Actually, this is but one of many. For instance, both input and/or output may connect directly to waveguide transmission lines.

It is thus evident that the arrangements shown in the drawing enable the cascading of high frequency electron tubes within a unitary structure having relatively few adjustments and having a degree of compactness and mechanical simplicity heretofore unavailable. It should be emphasized that although Fig. 2 is illustrative of a two-stage system, additional stages may be employed simply by physically extending the coaxial system. Where the stages thus used are greater than two, all additional equipment between input and output circuits will simply be repetitious of the components between disks 42 and 25 in Fig. 2. That is to say, this unit is the basic structural building block, any number of which may be axially stacked between an output circuit as shown in Fig. 2, and an input circuit as in either Fig. 2 or Fig. 4, until the desired voltage or power gain is obtained. Frequency transformation is readily achieved at any point in the system by selection of line length and adjustment of stub tuning. The novel access plates described permit tube change without disturbance of the mechanical adjustments of the remainder of the system.

It is, of course, possible to adapt the concepts herein disclosed for satisfactory operation with other types of electron tubes and with other types of bias arrangements. For example, instead of connecting the grid directly to ground by means of the conducting disk, the grid plane disks may be insulated from abutting outer cylinders and biased to whatever potential needed. The cathode connection could then be at D. C. ground potential. The capacitance between the grid disk and the grounded cylinders would be sufficient to prevent radio frequency signal leakage into the bias supply. Decision as to grid potential level, of course, is dependent upon the design specifications of a particular system.

In view of the fact, therefore, that numerous modifications and departures may now be made by those skilled in this electrical art, the invention herein is to be construed as limited only by the spirit and scope of the appended claims.

What is claimed is:

1. High frequency apparatus comprising, a plurality of axially aligned planar electrode electron tubes, means serially coupling said electron tubes comprising an outer coaxial conductive cylinder substantially wholly enclosing said electron tubes, inner coaxial conductive cylinders disposed within said outer cylinder for connecting each tube to the next successive tube and arranged whereby the region between each of said inner cylinders and said outer cylinder provides a high frequency transmission path intercoupling adjacent electron tubes, and access means in said outer and inner conductive cylinders permitting removal of each of said enclosed electron tubes.

2. High frequency apparatus comprising, an outer cylindrical conductor, transverse conductive disks partitioning said outer conductor into a plurality of axially aligned cylindrical chambers, a cylindrical inner conductor supported within each of said chambers in spaced relation with said disks, said disks and the adjacent ends of each of said inner conductors on opposite sides of said disks having electron tube electrode contact means, and means in said outer and inner conductors permitting the insertion of electron tubes in said contact means.

3. High frequency apparatus as in claim 2 wherein said outer and inner cylindrical conductors are formed with aligned openings ventilating said electron tubes.

4. High frequency apparatus comprising, a plurality of axially aligned concentric line sections separated by centrally perforated conductive partitions, each of said concentric line sections including an outer cylindrical conductor and an inner cylindrical conductor of lesser axial length, electron tubes intercoupling adjacent concentric line sections through said perforated conductive partitions for serially transferring energy from section to section, means connecting selected electron tubes to the adjacent ends of inner conductors of adjoining line sections, and a plurality of concentric line stubs for tuning each of said concentric line sections and having a hollow inner conductor communicating with the interior of said concentric line section inner conductor and permitting the passage of wires for energizing electrodes of said electron tubes.

5. High frequency apparatus comprising, a substantially cylindrical outer conductor terminated by first and second conductive end plates, a plurality of transverse conductive partitions dividing said outer conductor into axially aligned chambers, an inner cylindrical condutor coaxially supported within each of said chambers and axially spaced from said end plates and partitions, lighthouse tubes having axially spaced cathode, grid and anode connectors, each of said lighthouse tubes being supported to extend through one of said conductive partitions and having its grid connector in contact therewith, the anode and cathode connectors of each of said lighthouse tubes being in contact with the respective adjacent ends of the inner cylindrical conductors on opposite sides of the associated conductive partition, and stub tuners each having inner and outer hollow concentric conductors, the space between said concentric conductors being adjustable in dimension and communicating with a region between an associated inner cylindrical conductor and said outer conductor, each of said inner concentric conductors communiating with the interior of the associated inner cylindrical conductor, whereby potentials may be applied to the electrodes of said lighthouse tubes by conductors extending through the inner concentric conductors of said stubs.

6. High frequency apparatus as in claim 5 wherein said outer cylindrical conductor and each of said inner cylindrical conductors are formed with aligned semi-cylindrical hinged access plates for the removal and insertion of said lighthouse tubes.

7. High frequency apparatus comprising, a substantially cylindrical outer conductor terminated by first and second conductive end plates, a plurality of transverse conductive partitions dividing said outer conductor into axially aligned chambers, an inner cylindrical conductor coaxially supported within each of said chambers and axially spaced from said end plates and partitions, serially arranged lighthouse tubes having axially spaced cathode, grid and anode connectors, each of said lighthouse tubes being supported to extend through one of said conductive partitions and having its grid connector in contact therewith, the anode and cathode connectors of said lighthouse tubes being in contact with the respective adjacent ends of the inner cylindrical conductors on opposite sides of the associated conductive partition, means associated with said first conductive end plate for coupling high frequency energy to the grid-to-cathode region of the first of said lighthouse tubes, high frequency energy output coupling means associated with the second of said end plates and including a pick-up conductor extending therefrom to the inner cylindrical conductor associated with the last of said serial lighthouse tubes, and stub tuners each having inner and outer hollow concentric conductors, the space between said concentric conductors being adjustable in dimension and communicating with the region between the associated inner cylindrical conductor and said outer conductor, each of said inner concentric conductors communicating with the interior of the associated inner cylindrical conductor, and leads extending through the inner concentric conductors of said stubs for applying potentials to predetermined electrodes of said lighthouse tubes.

8. Apparatus as in claim 7 and including radially aligned semi-cylindrical hinged access plates in said outer cylindrical conductor and each of said inner cylindrical conductors in the region of the anodes of said lighthouse tubes, thereby permitting the withdrawal and insertion of each of said lighthouse tubes through said inner and outer cylindrical conductors.

9. Apparatus as in claim 8 and including openings formed in said outer conductor, each of said inner cylindrical conductors, and said hinged access plates for ventilating said lighthouse tubes.

10. High frequency apparatus comprising, a substantially cylindrical outer conductor, a transverse conductive partition dividing said outer conductor into first and second axially aligned cylindrical chambers, first and second lighthouse tubes having axially spaced cathode grid and anode ring connectors, first and second hollow cylindrical inner conductors coaxially supported within said first and second cylindrical chambers respectively and axially spaced from said conductive partition, the inner diameters of said first and second inner conductors being in excess of the maximum diameters of said lighthouse tubes to facilitate free axial motion of said lighthouse tubes therethrough, a central opening in said conductive partition, electrical coupling means disposed on said conductive partition in the region of said opening for conductively engaging said grid ring connector of said second lighthouse tube, electrical coupling means associated with the end of said second inner conductor adjacent to said conductive partition for electrically engaging said anode ring connector of said second lighthouse tube, a first conductive plate terminating said second inner conductor at the end opposite said second lighthouse tube, a second conductive plate terminating said outer conductor at the end adjacent said first conductive plate, an output coupler associated with said second end plate and including a conductor extending into electrical contact with said first end plate, means on the end of said first inner cylindrical conductor adjacent said conductive partition for electrically engaging said cathode ring connector of said second lighthouse tube, means at the opposite end of said first inner conductor for electrically engaging said anode ring connector of said first lighthouse tube, a second transverse conductive partition conductively affixed to said outer conductor and formed with an opening therein for electrically receiving said grid ring connector of said first lighthouse tube, means for applying high frequency energy to the grid-to-cathode region of said first lighthouse tube, stub tuners for tuning the regions between said inner cylindrical conductors and said outer cylindrical conductor, and access plates in said outer conductor and said first and second inner conductors in the regions of said anode ring connectors whereby said first and second lighthouse tubes may be inserted and withdrawn through said inner and outer conductors.

11. High frequency apparatus comprising, a substantially cylindrical outer conductor terminated by first and second conductive end plates, first and second transverse conductive partitions dividing said outer cylindrical conductor into first, second and third axially aligned cylindrical chambers, first, second and third hollow cylindrical conductors coaxially supported within said first, second and third chambers respectively and axially spaced from said end plates and partitions, first and second lighthouse tubes having axially spaced cathode, grid and anode ring connectors and disposed between said first and second, and said second and third cylindrical chambers, said grid ring connectors of said first and second lighthouse tubes being conductively engaged in said first and second transverse partitions respectively, means on said first and second inner cylindrical conductors for conductively engaging said cathode ring connectors of said first and second lighthouse tubes respectively, means on said second and third inner cylindrical conductors for conductively engaging the anode ring connectors of said first and second lighthouse tubes respectively, said inner cylindrical conductors having inner diameters in excess of the maximum diameters of said lighthouse tubes to facilitate free axial motion of said lighthouse tubes therethrough, an input coaxial coupler disposed on said first end plate and having an inner conductor extending into said first cylindrical chamber in engagement with said first inner conductor, an output coaxial coupler disposed on second end plate and having an inner conductor extending into said third cylindrical chamber in electrical engagement with said third inner conductor, access plates in said outer conductor and said second and third inner conductors in the regions of said anode ring connectors for facilitating the insertion and withdrawal of said first and second lighthouse tubes, and means for tuning said first, second and third cylindrical chambers, whereby high frequency energy applied to said input coaxial coupler is transmitted to the grid-to-cathode region of said first lighthouse tube for amplification and transmission through said second cylindrical chamber for application to said grid-to-cathode region of said second lighthouse tube for further amplification and transmission through said third cylindrical chamber for application to said output coaxial coupler.

12. High frequency apparatus comprising, a plurality of axially aligned concentric line sections separated by centrally perforated conductive partitions, each of said concentric line sections including an outer cylindrical conductor and an inner cylindrical conductor of lesser axial length, electron tubes intercoupling adjacent concentric line sections through said perforated conductive partitions, means connecting predetermined electron tubes to the adjacent ends of inner conductors of adjoining line sections, and aligned access plates in said outer and inner conductors in the region of each of said electron tubes for facilitating withdrawal and insertion of said tubes.

13. High frequency apparatus comprising, a plurality of axially aligned concentric line sections separated by centrally perforated conductive partitions, each of said concentric line sections including an outer cylindrical conductor and an inner cylindrical conductor of lesser axial length, electron tubes intercoupling adjacent concentric line sections through said perforated conductive partitions, means connecting predetermined electron tubes to the adjacent ends of inner conductors of adjoining line sections, and aligned access plates in said outer and inner conductors in the region of each of said electron tubes for facilitating withdrawal and insertion of said tubes, said access plates are formed with aligned openings for ventilation of said electron tubes.

14. High frequency apparatus comprising, an outer cylindrical conductor terminated by first and second conductive end plates, a plurality of centrally perforated conductive disk partitions dividing said outer cylindrical conductor into axially aligned cylindrical chambers, an inner conductive cylinder coaxially supported within each of said cylindrical chambers in spaced non-contacting relation with said conductive disks and end plates, axially aligned lighthouse tubes each having axially spaced grid, cathode and anode connectors serially intercoupling adjacent cylindrical chambers through said conductive disks, each lighthouse tube having its grid connector in contact with its associated conductive disk and its cathode and anode connectors in contact with the adjacent ends of said inner conductive cylinders on opposite sides of said associated conductive disk, means associated with said first conductive end plate for introducing high frequency to the region of the grid and cathode connectors of the first of said aligned lighthouse tubes, and means associated with said second conductive end plate for extracting high frequency energy from the region of the grid and anode connectors of the last of said aligned lighthouse tubes.

15. High frequency apparatus comprising, an elongated outer conductive member terminated by conductive end plates and transversely partitioned by conductive disks to form a plurality of aligned chambers, inner conductive members supported in each of said chambers, means associated with one of said conductive end plates for introducing high frequency energy to the first of said aligned chambers, means associated with the other of said conductive end plates for extracting high frequency energy from the last of said aligned chambers, each of said conductive disks and each of said inner members on opposite sides of each disk having connectors adapted to engage the electrode terminals of an electron tube, said connectors associated with said inner members being insulatedly supported thereon and capacitively coupled thereto.

16. High frequency apparatus comprising, an elongated outer conductive member terminated by conductive end plates and transversely partitioned by conductive disks to form a plurality of aligned chambers, inner conductive members supported in each of said chambers, means associated with one of said conductive end plates for introducing high frequency energy to the first of said aligned chambers, means associated with the other of said conductive end plates for extracting high frequency energy from the last of said aligned chambers, each of said conductive disks and each of said inner members on opposite sides of each disk having connectors adapted to engage the electrode terminals of an electron tube, tuners associated with said chambers, and conductors extending through said tuners and contacting predetermined connectors on said inner members.

References Cited in the file of this patent

UNITED STATES PATENTS

| | | |
|---|---|---|
| 2,066,674 | Dunmore | Jan. 5, 1937 |
| 2,143,671 | Zottu | Jan. 10, 1939 |
| 2,521,945 | Rado | Sept. 12, 1950 |
| 2,524,821 | Mountgomery | Oct. 10, 1950 |
| 2,615,998 | Carchian | Oct. 28, 1952 |
| 2,626,356 | Gibson | Jan. 20, 1953 |